United States Patent [19]
McBride

[11] 4,162,797
[45] Jul. 31, 1979

[54] EXERCISE TRICYCLE

[76] Inventor: Thomas W. McBride, 716 E. Main St., Hoopeston, Ill. 60942

[21] Appl. No.: 838,751

[22] Filed: Oct. 3, 1977

[51] Int. Cl.² .......................... B62K 5/06; B62M 1/20
[52] U.S. Cl. ................................. 280/275; 280/226 R; 280/276; 280/282
[58] Field of Search ................... 280/226 R, 282, 283, 280/275, 277, 276, 1.191, 223, 226 A, 227, 230

[56] References Cited
U.S. PATENT DOCUMENTS

| 404,693 | 6/1889 | Easthope | 280/275 |
| 1,623,400 | 4/1927 | Englund | 280/282 |
| 2,860,890 | 11/1958 | Oxford et al. | 280/226 |

FOREIGN PATENT DOCUMENTS 553962  6/1923  France .......................... 280/275

Primary Examiner—Joseph F. Peters, Jr.
Assistant Examiner—Donn McGiehan
Attorney, Agent, or Firm—Hill, Van Santen, Steadman, Chiara & Simpson

[57] ABSTRACT

An exercise tricycle may have either one or all of a number of exercise features in addition to the exercise to be derived from pedaling the tricycle. One such additional feature comprises a steering wheel and fork assembly adapted to be maneuvered in a front to rear direction in opposition to a spring bias by maneuvering the handle bars. Another exercise feature may comprise a vertically rockable seat connected for rocking motivation to the axle of rear running wheels of the tricycle.

12 Claims, 7 Drawing Figures

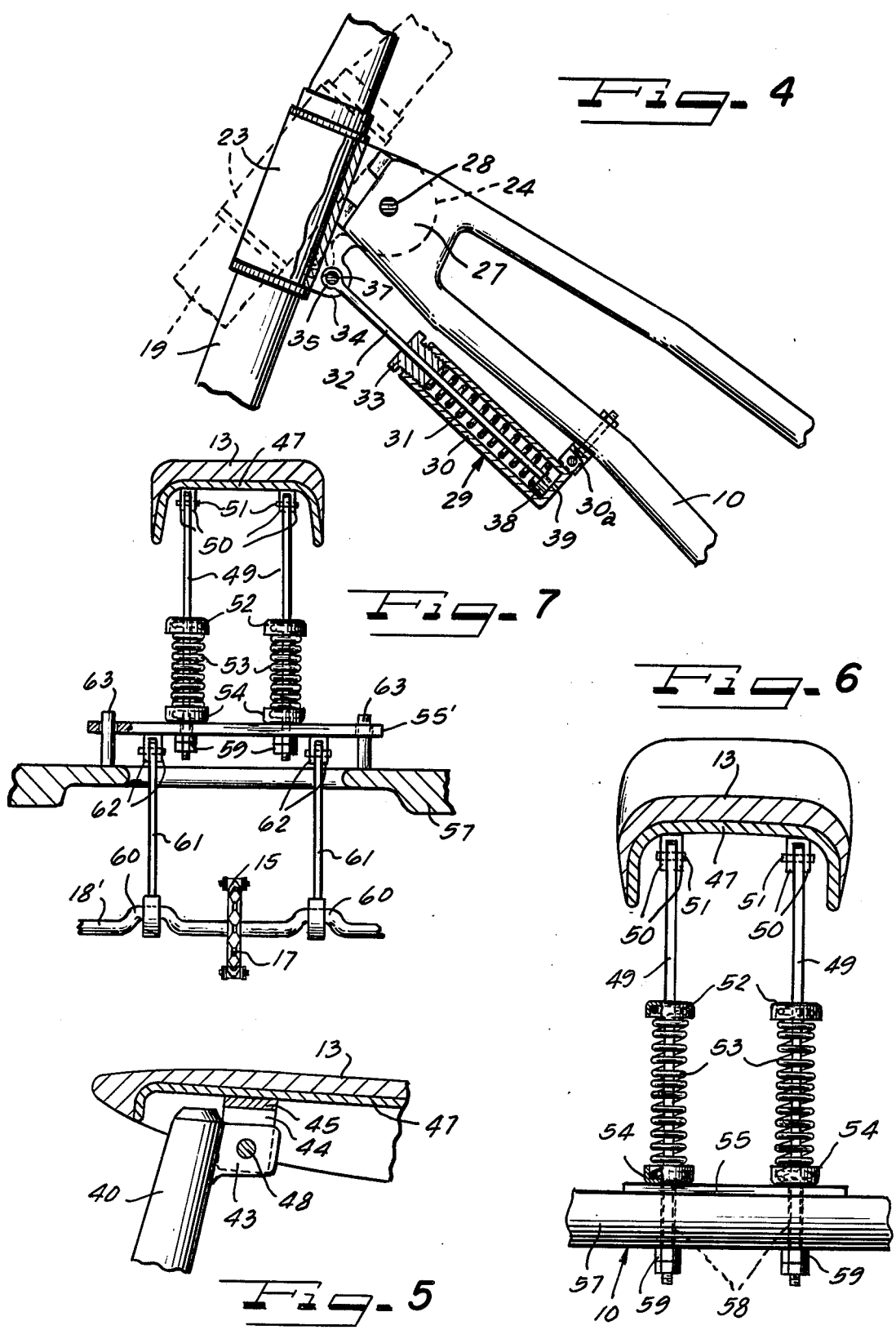

EXERCISE TRICYCLE

A tricycle having pedal drive means for the rear wheel will provide a fair amount of exercise for the pedaler's legs and provide circulatory stimulation. There may also be some abdominal exercise provided. However, merely pedaling affords little if any exercise for the upper torso including the arms, shoulders and back of the person seeking exercise by use of the tricycle.

An important object of the present invention is to provide a new and improved exercise tricycle which provides substantially greater exercise facility than merely pedaling the same.

Another object of the invention is to provide a new and improved tricycle having means to promote upper torso exercise for the user.

A further object of the invention is to provide a new and improved tricycle having means for effecting arm and shoulder and upper torso exercise while riding the tricycle.

Still another object of the invention is to provide a new and improved tricycle having back exercising facility for the user.

According to an embodiment of the invention, there is provided an exercise tricycle having a rigid frame, a pair of spaced rear rotary running wheels mounting the rear portion of the frame, a front rotary steering wheel mounting the front portion of the frame, a seat supported on and above the rear portion of the frame, and pedal operated driving means mounted on the frame intermediate said front and rear wheels at a suitable location below said seat and having a driving connection with said rear wheels, and comprising a fork attached to said front wheel and having an upwardly extending journal end portion and stem attached to a handlebar; bearing sleeve means within which said journal end portion is rotatable for steering maneuver of said front wheel by manipulation of said handlebar; said front portion of said frame having a single forwardly extending part providing terminal projection means for attachment to said bearing sleeve; means pivotally connecting said bearing sleeve on a single horizontal axis to said terminal projection means, whereby said fork and thereby said front wheel can be shifted between a rearward position and a forwardly extending position by manipulating said handlebar for rocking said bearing sleeve and thereby also said fork about said horizontal axis relative to said frame, and thereby also shifting the center of gravity of said frame between an upper position and a lower position; and biasing means operating between said bearing sleeve and said frame for normally urging said sleeve, fork and wheel toward one of said positions.

According to other features of the invention the tricycle may be provided with seat pivot means connecting a seat height adjusting stem and a front portion of the seat pivotally about a horizontal axis to the tricycle frame, a rotary driving axle connected to and between the rear wheels of the tricycle, pedal operated driving means connected to the axle for rotatably driving the axle, crank means on the axle, and means connecting the crank means directly with a rear portion of the seat for rocking the seat about the seat pivot means by operation of the crank means during rotation of the axle.

Other objects, features and advantages of the invention may be readily apparent from the following description of certain representative embodiments thereof, taken in conjunction with the accompanying drawings although variations and modifications may be effected without departing from the spirit and scope of the novel concepts embodied in the disclosure and in which:

FIG. 4 is a sectional elevational view taken substantially along the line IV—IV in FIG. 3.

FIG. 5 is a fragmentary sectional elevational view of the front portion of the seat and its mount.

FIG. 6 is an enlarged fragmentary sectional elevational view taken substantially along the line VI—VI of FIG. 1; and FIG. 7 is a fragmentary rear elevational view of a modified mounting of the tricycle seat to provide it with a rocking action.

Figure 1:
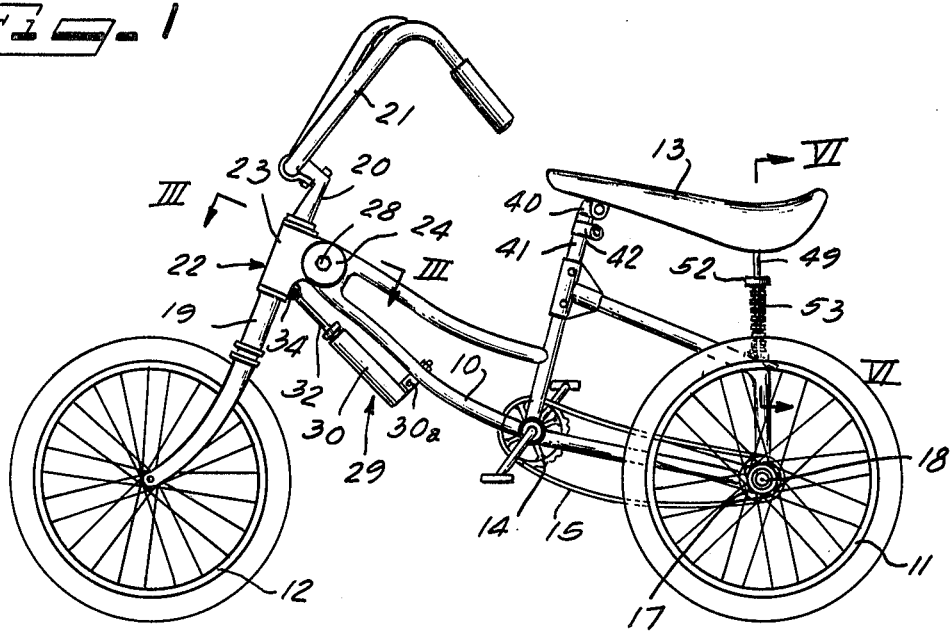
FIG. 1 is a side elevational view of a tricycle embodying features of the inventions.
Figure 2:
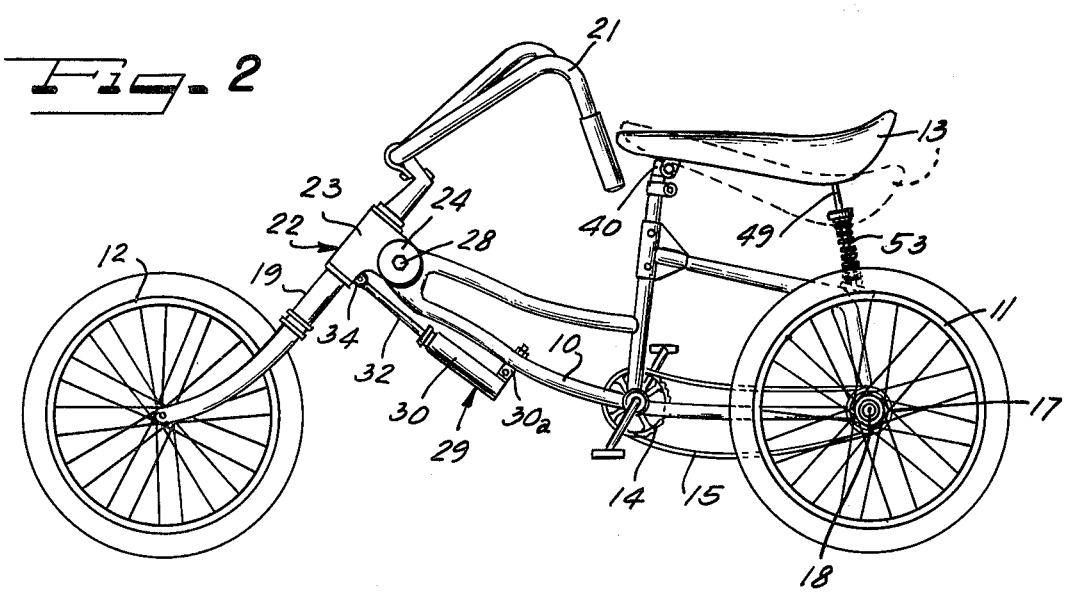
FIG. 2 is another side elevational view of the tricycle in demonstrating an exercising mode.

Having reference to FIGS. 1 and 2, a tricycle embodying features of the invention is depicted having a rigid frame 10, a pair of spaced rotary running wheels 11 mounting the rear portion of the frame, a front rotary steering wheel 12 mounting the front portion of the frame, a seat 13 supported on and above the rear portion of the frame, and pedal operated driving means comprising a driving sprocket 14 mounted on the frame intermediate the front and rear wheels at a suitable location below the seat and having a driving connection as by means of a sprocket chain 15 with a driven sprocket 17 corotative with an axle 18 suitably journaled on the lower rear portion of the frame and adapted to drive the wheels 11 for running of the tricycle.

A fork 19 is attached to the front wheel 12 in customary manner and has an upwardly extending stem 20 attached to a handlebar 21. Journal means 22 are provided comprising a bearing sleeve 23 within which the upper journal end portion of the fork 19 with the stem 20 is rotatable for steering manuever of the front wheel 12 by manipulation of the handle bar 21.

Figure 3:
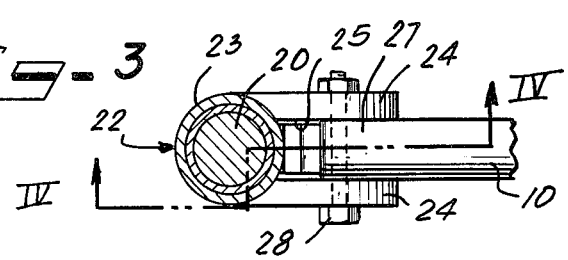
FIG. 3 is a fragmentary enlarged sectional plan view taken substantially along the line III—III in FIG. 1.

According to the present invention, the bearing sleeve 23 is pivotally connected to the front portion of the frame 10 whereby the fork 19 and thereby the front wheel 12 can be shifted between a rearwardly position as shown in FIG. 1 and a forwardly extended position as shown in FIG. 2. For this purpose, the tubular sleeve 23 is connected to the front of the frame 10 by furcular knuckle means comprising a pair of coextensive spaced vertical plane, rearwardly extending ear flanges 24 (FIG. 3) on the sleeve 23 defining a vertical slot 25 therebetween within which is received a front end knuckle tongue 27 comprising an integral front end projection part of the frame 10. Means comprising a pin bolt 28 pivotally connects the frame tongue 27 in coupled relation to and between the ear flanges 24 for relative pivotal movement on a horizontal axis.

Biasing means are provided for normally urging the fork toward one of the positions attainable by means of the horizontally pivotal knuckle connection of the fork to the frame. In a desirable construction the biasing means comprises a spring cylinder device 29 (FIGS. 1 and 4) including a tubular cylinder 30 having therein a coiled compression spring 31. In a preferred arrangement, the device 29 is mounted under the front portion of the frame 10, having for this purpose knuckle means 30a securing the rear end of the cylinder 30 pivotally to the frame 10 and from which the cylinder 30 projects forwardly to terminate in spaced relation to the lower portion of the sleeve member 23. A piston rod 32 projects slidably through a bushing 33 on the front end of the cylinder 30 and is connected at its forward end to the journal member 23. Conveniently the connection between the piston rod 32 and the journal member 23 is effected by means of a furcular knuckle structure comprising spaced coextensive vertically oriented rearwardly projecting ear flanges 34 between which an eye 35 on the forward end of the rod 32 is pivotally connected by means of a pivot pin 37. In this instance the arrangement is such as to effect a rearward bias of the fork 19 about the pivot 28. Accordingly, the compression spring 31 thrusts at its forward against the inner end of the bushing 33 and the rear end of the spring thrusts against a piston 38 on the inner end of the piston rod 32. The spring 31 is of a biasing strength and under sufficient compression to normally thrust the piston rod 32 rearwardly and thereby bias the fork 19 rearwardly through the pivotally mounted sleeve member 23. When it is desired to extend the fork 19 and thereby the steering wheel 12, manipulation of the handlebar 21 rearwardly effects pivoting about the pivot 28 against the bias of the spring 31. As the spring 31 is compressed between the forwardly advancing piston 38, progressively greater biasing force is generated until the spring bottoms out and thus limits the forward projection of the steering wheel. Upon release of the counter-biasing rearward pull on the handlebar 21, the spring 31 returns the steering wheel system back to the normal rearward position. Forwardly of the piston 38, air pressure may supplement to some extent the resistance to forward projection of the front wheel fork and front wheel, and to prevent an air lock, a relief port 39 is desirably formed in the closed rear end of the cylinder 30. The degree of looseness between the piston 38 and the inner wall of the cylinder 30 will determine how much compressed air resistance will be present in the biasing assembly 29.

In a desirable construction and arrangement of the seat 13, it may be of a form similar to a motorcycle seat comprising an elongate structure narrower at the front and wider at the rear and turned up substantially as shown. For cushioning purposes and to permit rocking action of the seat 13 under the weight of a rider to compensate for the necessary downward tilting of the frame 10 about the axis of the axle 18 when the front wheel 12 is extended as shown in FIG. 2, the saddle seat 13 is desirably pivotally connected at its front end to the top of the frame and is supported to swing downwardly at its rear end. For this purpose a depending seat stem 40 (FIGS. 1 and 5) under the front end portion of the seat 13 is engaged in vertically adjustable relation in an upstanding tubular socket 41 on the frame 10 and secured in desired vertical adjustment as by means of a conventional screw clamp 42 customarily used on bicycles and tricycles. On its upper end, the seat stem 40 has knuckle means comprising a rearwardly extending vertically oriented rigid ear 43 extending between downwardly extending parallel knuckle ears 44 of a clevis-like bracket 45 rigidly secured to the underside of the front end portion of the seat 13 and more particularly a seat underplate 47. A transverse pivot pin 48 effects a pivotal connection between the ears 43 and 44.

Under the rear portion of the seat 13 cushioning and vertical adjustment means comprise a pair of depending guide rods 49 (FIGS. 1 and 6) pivotally secured at their upper ends to the underside of the seat pan 47 by suitable knuckle means comprising knuckle ears 50 to which upper end portions of the rods are pivotally attached as by means of pivot pin means 51. Intermediate their ends, the rods 49 have fixed thereon downwardly facing thrust shoulder cups 52 resting on the tops of respective coiled compression springs 53 which encircle the rod and thrust at their lower ends into respective upwardly facing thrust shoulder centering cups 54 on top of a thrust plate 55 supported on a cross bar 57 of the frame 10. At their lower end portions, the rods 49 extend freely downwardly through the thrust cups 54 and the plate 55 and through clearance holes 58 in the bar 57 to permit reciprocable movement of the rods 49. Limit on upward movement the rods 49 under the bias of the springs 53 is effected by stop means on the portions of the rods which project below the cross bar 57 and which may comprise lock nuts 59 threaded onto the rods and permitting any desirable adjustments.

To increase the exercise action of the tricycle, means may be provided for rocking the tricycle seat 13 in vertical direction about the front pivot 48. For this purpose as exemplified in FIG. 7, the rear supporting rods 49 for the seat may be connected to suitable crank means 60 on the axle 18'. As shown, the crank means 16 may comprise a pair of spaced crank formations shaped in the shaft of the axle 18' with the sprocket 17 keyed to the axle between the crank formations 16. Respective crank links 61 connect the cranks 60 to the underside of the base plate 55' which is provided with furcular knuckle means 62 connecting the upper ends of the links pivotally to the plate. Thereby, as the tricycle travels, the base plate 55' is reciprocated up and down, whereby the seat rods 49 are correspondingly reciprocated to cause rocking of the seat 13. Cushioning of the seat and adjustment of the seat attitude with tilting of the tricycle frame by extension and retraction of the steering wheel are accommodated by the spring mounting and reciprocating adjustment capability of the rods 49 relative to the base plate 55'. For guiding vertical reciprocations of the plate 55', the tricycle frame bar 57 may be suitably modified where it underlies the plate 55' to provide clearance for the links 61 and to support rigid upstanding guide pins 63 which extend slidably through suitable bearing holes in the plate 55'.

From the foregoing it will be apparent that the tricycle of the present invention provides several improvements and advantageous features beneficial for the user. As an exercise vehicle it affords an interesting, multiple action device which will provide mild but nevertheless effective exercise for all parts of the rider's body. The leg muscles and vascular system are exercised and stimulated by the pumping action incident to pedaling the vehicle. The arms and torso are adapted to be exercised by operating the steering wheel oscillatably as aided by the biasing spring. As the bicycle frame rocks about the rear axle incident to extension and retraction of the steering wheel, the lower torso is exercised by rocking motion as accommodated by the cushioned rockably mounted saddle seat. Where the vehicle is equipped with means for rear axle induced rocking of the seat, further torso exercise is induced in the running operation of the vehicle. It may also be noted that when the steering wheel is extended, the center of gravity drops so that steering turns of the vehicle are safer, where such turns are necessarily sharp or at substantial speed.

It will be understood that variations and modifications may be effected without departing from the spirit and scope of the novel concepts of this invention.

I claim as my invention:

1. An exercise tricycle having a rigid frame, a pair of spaced rear rotary running wheels mounting the rear portion of the frame, a front rotary steering wheel mounting the front portion of the frame, a seat supported on and above the rear portion of the frame, and pedal operated driving means mounted on the frame intermediate said front and rear wheels at a suitable location below said seat and having a driving connection with said rear wheels, and comprising:

a fork attached to said front wheel and having an upwardly extending journal end portion having a stem attached to a handlebar;

bearing sleeve means within which said journal end portion is rotatable for steering maneuver of said front wheel by manipulation of said handlebar;

said frame front portion having a single forwardly extending part providing terminal projection means for attachment to said bearing sleeve means;

means pivotally connecting said bearing sleeve means on a single horizontal axis to said terminal projection means, whereby said fork and thereby said front wheel can be shifted between a rearward position and a forwardly extended position by manipulating said handlebar for rocking said bearing sleeve and thereby said fork about said horizontal axis and correspondingly shifting the center of gravity of the tricycle;

and biasing means operating between said bearing sleeve means and said frame for normally urging said sleeve means, fork and wheel toward one of said positions.

2. A tricycle according to claim 1, wherein said biasing means normally urges said bearing sleeve means and said fork and thereby said steering wheel into the rearward position, so that for shifting the fork and thereby the front wheel toward the forwardly extended position the force of said biasing means must be overcome by pulling back on the handlebar.

3. A tricycle according to claim 1, wherein said biasing means comprises a forwardly extending cylinder attached to said frame and enclosing a compression spring, shoulder means facing inwardly at a forward end of said cylinder, said compression spring having a forward end compressing against said shoulder means, a piston engaged by the rear end of said spring, and a piston rod extending forwardly from said piston through the spring and passed said shoulder means and being attached to said bearing sleeve means.

4. A tricycle according to claim 1, wherein said frame has a rigid support located substantially above said driving means, means freely pivotally connecting the front end portion of the seat to said rigid support on said frame, and means yieldably supporting the rear portion of the seat for up and down rocking movement about said free pivotally connecting means.

5. A tricycle according to claim 4, including means for effecting rocking of said seat in the running operation of the tricycle.

6. A tricycle according to claim 1, wherein said pivotally connecting means comprises furcular knuckle means comprising a pair of coextensive spaced vertical plane ear flanges on one of said sleeve means and said front portion of the frame and a tongue on the other of said sleeve means and front portion of the frame and engaged between said ear flanges, and a pin bolt pivotally connecting the tongue and flanges for relative pivotal movement on said horizontal axis.

7. An exercise tricycle having a rigid frame, a pair of spaced rear rotary running wheels mounting the rear portion of the frame, a front rotary steering wheel mounting the front portion of the frame, a seat supported on and above the rear portion of the frame, and pedal operated driving means mounted on the frame intermediate said front and rear wheels at a suitable location below said seat and having a driving connection with said rear wheels, and comprising:

a depending seat stem;

upstanding tubular socket means on the top of said frame in which said seat stem is received, and having means for adjustably securing the seat stem adjustably in the socket means;

seat pivot means connecting the top of said seat stem and a front portion of said seat pivotally about a horizontal axis for up and down rocking movements of said seat relative to said frame;

a rotary driving axle connected to and between said rear wheels;

said pedal operated driving means being connected to said axle for rotatably driving the axle;

crank means on said axle;

and means connecting said crank means directly with a rear portion of said seat for rocking the seat about said seat pivot means by operation of said crank means during rotation of said axle.

8. A tricycle according to claim 7, including a supporting structure underlying said rear portion of the seat in spaced relation, cushioning means yieldably supporting the rear portion of the seat on said supporting structure, and said crank means including link structure attached to said supporting structure and acting to reciprocate said supporting structure and thereby effecting rocking of said seat.

9. A tricycle according to claim 7, wherein said connecting means comprise a pair of upstanding rods pivotally connected to the underside of the seat.

10. A tricycle according to claim 9, including a supporting structure, said rods being reciprocable relative to said supporting structure, and coiled compression springs disposed about said rods and yieldably supporting said rods on said supporting structure.

11. A tricycle according to claim 7, wherein said front wheel has a fork having an upwardly extending stem attached to a handlebar, bearing sleeve means on said front portion of said frame and within which said stem is rotatable for steering maneuver of said front wheel by manipulation of said handlebar, means pivotally connecting said sleeve means on a single horizontal axis to said front portion of said frame whereby said fork and thereby said front wheel can be shifted between a rearward position and a forwardly extending position, whereby a person operating said tricycle receives beneficial exercise and stimulation by pedal operating the driving means, by rocking of said seat and by shifting the fork and front wheel between said rearward and forward positions.

12. A tricycle according to claim 11, wherein said pivotally connecting means comprises furcular knuckle means comprising a pair of coextensive spaced vertical plane ear flanges on one of said sleeve means and said front portion of the frame and a tongue on the other of said sleeve means and front portion of the frame and engaged between said ear flanges, and a pin bolt pivotally connecting the tongue and flanges for relative pivotal movement on said horizontal axis.

* * * * *